(No Model.) 2 Sheets—Sheet 1.

M. B. MORRIS.
ANIMAL TRAP.

No. 548,578. Patented Oct. 22, 1895.

Witnesses:
Geo. E. Frech.

M. B. Morris
per Pattison & Nesbit
Attorneys

Inventor.

(No Model.) 2 Sheets—Sheet 2.
M. B. MORRIS.
ANIMAL TRAP.
No. 548,578. Patented Oct. 22, 1895.
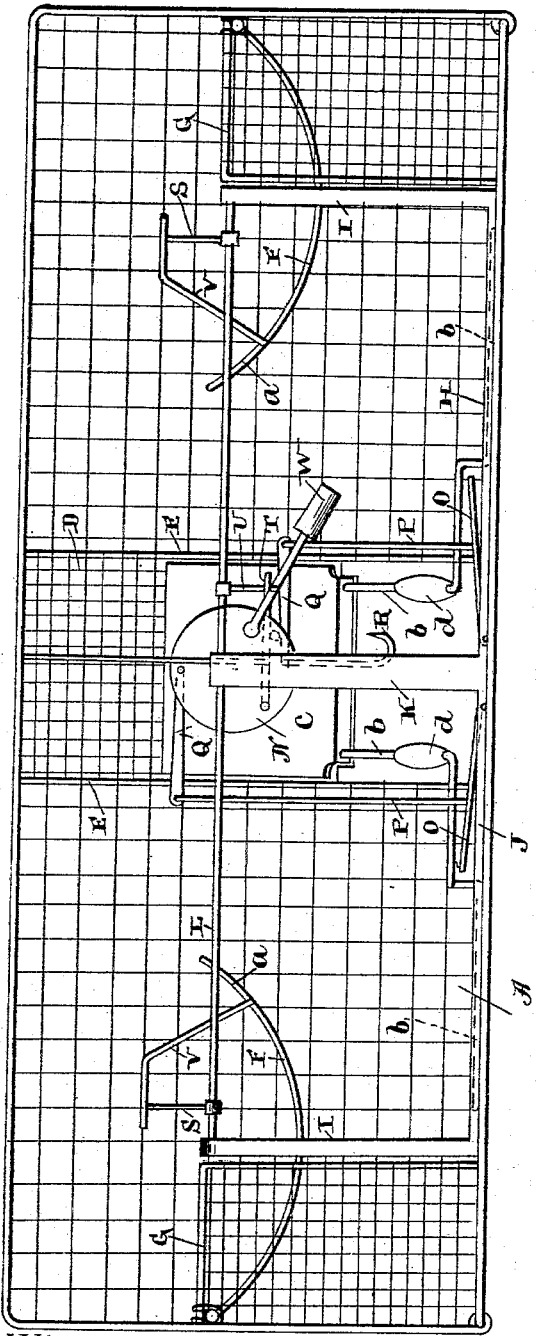
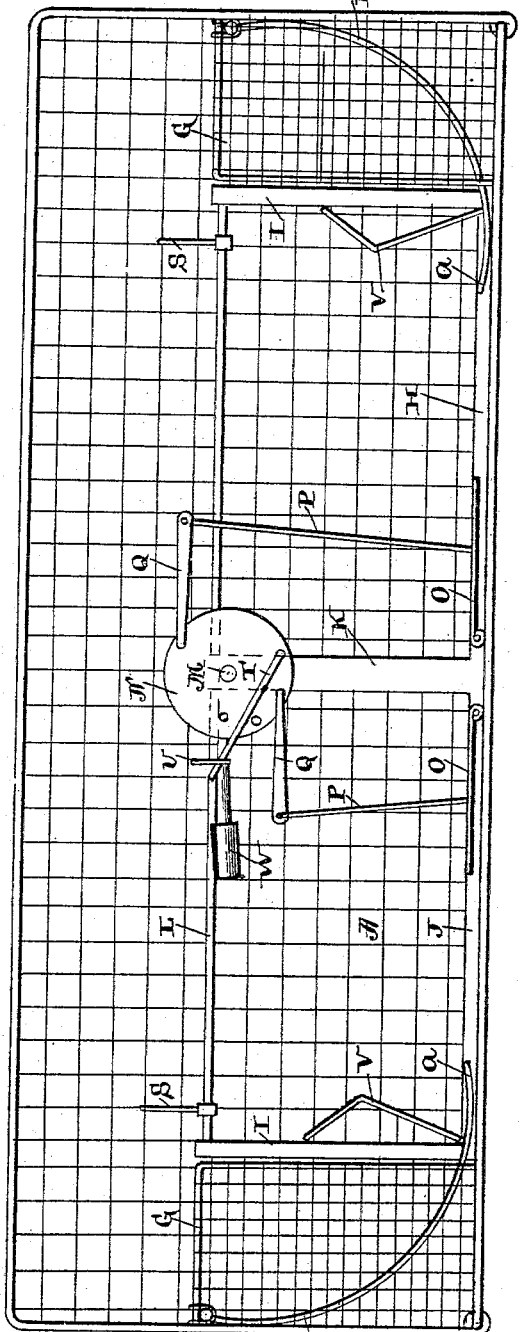
Witnesses:
Geo. E. Frech,
James W. Bevard
Inventor.
M. B. Morris
per Pattison & Neslit
Attorneys.

UNITED STATES PATENT OFFICE.

MARK B. MORRIS, OF LOGANSPORT, INDIANA.

ANIMAL-TRAP.

SPECIFICATION forming part of Letters Patent No. 548,578, dated October 22, 1895.

Application filed March 5, 1895. Serial No. 540,648. (No model.)

*To all whom it may concern:*

Be it known that I, MARK B. MORRIS, of Logansport, in the county of Cass and State of Indiana, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to improvements in automatic animal-traps; and it relates to that class of traps in which the animal by its weight trips the entrance-doors and then in passing to an assembly-room automatically sets the doors again for another catching operation.

The object of this invention is an improvement upon my patent granted June 26, 1894, and the differences relate to the construction of the doors, the method of setting them and holding them, and in the particular mechanism for tripping the doors after being set.

Figure 1:
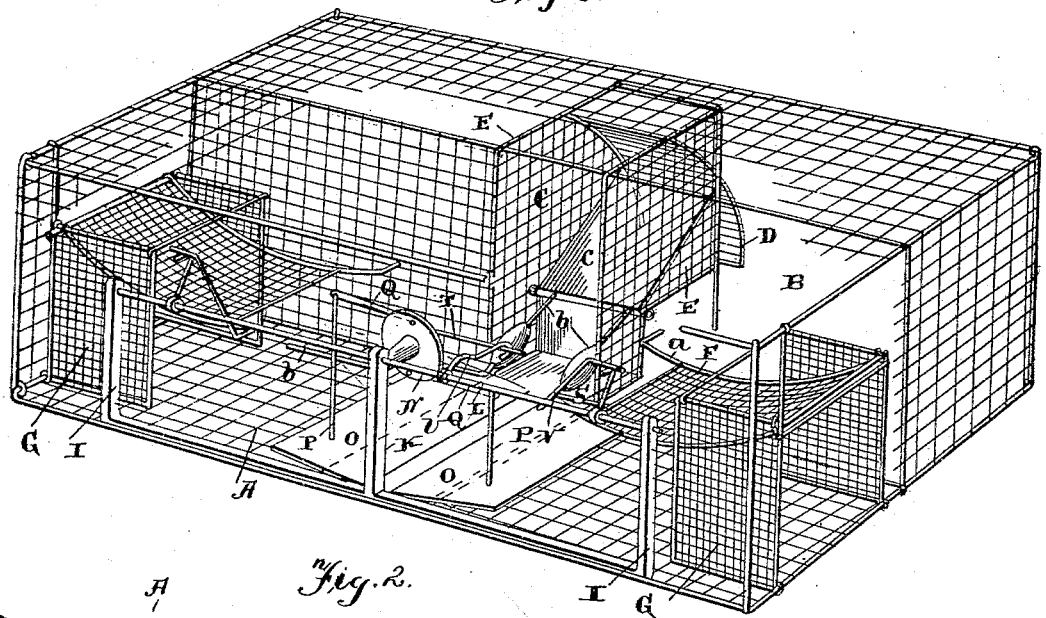
Figure 2:
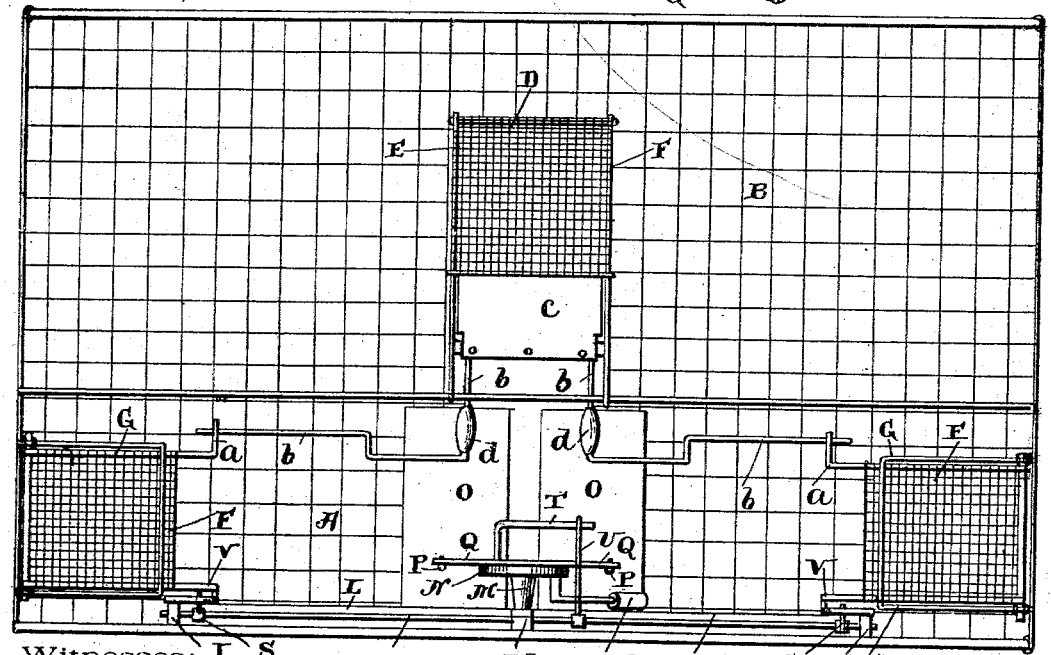

In the accompanying drawings, Figure 1 is a perspective view of a trap embodying my invention, the inclosing wire being broken away to show the interior mechanism. Fig. 2 is a top plan view of the same. Fig. 3 is a front view of the same, the inclosing wire at the end being removed and the trap being shown set. Fig. 4 is a vertical section taken longitudinal the catching-chamber and looking outward in the direction indicated by arrow in Fig. 2.

Referring to the drawings, A indicates a catching-chamber which extends the whole width of the trap, and B an assembly-chamber, also extending the whole width of the trap, the catching and the assembly chambers being communicating through the medium of a central passage-way C. This passage-way has a curved top and ends D and sides E, which do not extend down to the bottom of the trap, thus leaving sufficient room for the passage of the animal under them into the assembly-chamber.

At each end of the catching-chamber A the downwardly and inwardly extending or curved doors F are provided, which are pivoted at their upper ends, and the openings in the ends of the chamber for the said doors have inwardly-extending walls G at each side of the doors, as clearly shown, whereby the opening is entirely closed. Supported at the outer side of this chamber A is a framework H, having vertical end pieces I, base J, and vertical central standards K. A rod or shaft L is journaled and supported in the upper end of these standards, and extending inward from the central standard is a spindle or journal M, upon which is journaled a wheel N.

Platform or treadles O are pivoted at their inner ends adjacent each other and at the center of the chamber A and have extending upward therefrom, near their outer ends, the standards P. These standards P are connected with the wheel through the medium of the pitman or link Q, whereby when these treadles are either depressed or elevated the wheel is correspondingly operated.

A hook R is suspended from the top of the chamber A over a point between the inner ends of the treadles, and upon this hook the bait is to be secured, whereby the animal in attempting to reach the bait steps upon one or other of these platforms or treadles, thus depressing it and correspondingly turning the wheel. Extending from this wheel in any suitable manner is an arm or lever T, and loosely resting upon or connected with the end of this arm or lever is an arm U, which has its opposite end firmly connected with the shaft journaled in the upper ends of the standards heretofore mentioned. In this manner, when the treadles are depressed, the wheel is turned and through the medium of the arms the rock-shaft is also turned or oscillated, and extending upward and slightly inward at each end of this rock-shaft are the arms or catches S, having their upper ends bent outward, the wheel thus acting as a lever.

The outer side of the inner ends of the doors have the upwardly and outwardly extending bent arms V, which, when the doors are elevated, engage the inner inclined sides of the arms or latches S of the rock shaft, thus turning it slightly by forcing the latches outward, and as soon as these arms of the doors are above the upper end of the latches they drop inward under the ends of the arms and thus support the doors, as clearly shown in the drawings, and, as will be readily understood, the rock-shaft being held normally with the latches inward through the medium of the wheel, which is provided with a weighted arm W. This weighted arm is positioned to normally hold the treadles up ready to be depressed, and by a depression thereof through the medium of the mechanism heretofore described gives the rock-shaft a partial turn and throws the latches S outward from under the arms of the doors.

The inner ends of the doors at the opposite side from the arms heretofore mentioned are provided with inwardly-extending arms $a$, which normally rest upon the oppositely-extending arms $b$, having their opposite ends firmly connected with the pivoted ends of a platform $c$, which is supported within the passage-way between the catching-chamber and the assembly-chamber. These arms are preferably weighted, as shown at $d$, so that the platform is normally held upward by the weight of the arms normally resting upon the bottom of the trap. Owing to this construction, when the free ends of the platform within the passage-way are depressed by the weight of an animal passing from the catching-chamber to the assembly-chamber the arms connected therewith are elevated, and these, resting beneath the arms of the doors, elevate the doors until the arms at the opposite sides of the doors are caught over the latches S of the rock-shaft, thus supporting them in a set position. As soon as the animal leaves the platform by passing into the assembly-chamber, the platform again automatically rises, so that the animal cannot pass therefrom.

The assembly-chamber and also the catching-chamber are provided with doors at suitable points for permitting admission thereto for any desired purpose, the door in the assembly-chamber being for the purpose of permitting the animals to pass thereout.

The operation of my invention is as follows: The trap being set by elevating the doors and having them supported upon the latches S of the rock-shaft, and thereby the platforms having their free ends elevated, an animal passing in either of these doors and attempting to get to the bait steps upon one or the other of these platforms, which instantly depresses and through the medium of the wheel and arm slightly oscillates the rock-shaft, thus releasing the doors, which instantly drop. The animal then in attempting to get out of the catching-chamber naturally goes through the passage-way, that being the only exit therefrom, and in passing therefrom the platform is depressed, thus substantially dumping him into the assembly-chamber, and the depression of the platform in the passage-way elevates the doors and again sets them in the manner previously described.

While I here show the platform connected with a single wheel, and thus made dependent one upon the other, it will be readily understood that a single wheel may be provided for each platform or treadle and one operate independent of the other.

The trap may be made of any desired contour, size, and material, according to the purpose for which it is to be used.

It will also be readily understood that instead of having a double trap, as here shown—that is, with two inlet-doors—a single-door trap may be constructed upon the same principle as herein described and shown without deviating from the spirit of my invention.

If desired, I can connect the bait-hook with the wheel that is attached to the treadle, either in a single or double machine, so that if the weight of the animal fails to trip the doors or throw the trap the pull upon the bait will throw it, or if he should fail to step upon the treadle but pull upon the bait the trap will likewise be thrown, as will be readily understood. So, also, I can make them with the bait-hook alone, or with the treadle alone, or both combined.

In some instances it may be desirable to inclose the bait within a wire frame, so that the animal cannot get at it, as some animals would remain in the catching-chamber and devour the bait before going to the assembly-chamber. By having the bait inclosed in a wire frame, which permits it to see it and attempt to get it, and in doing so tripping the trap and closing the doors, the animal will then pass into the assembly-chamber immediately and leave the bait to attract others.

I wish, also, to state that instead of using the platform in the communicating passage between the catching-chamber and the assembly-chamber I can use a door similar to that in the catching-chamber, so that the animal in passing from the catching to the assembly chamber will lift this door, and this door will be so connected with the catching-doors that when it is lifted and again dropped down it will set the doors in the manner herein previously shown and described.

It will also be readily understood that springs may be used connected to either the door or the platform instead of weights, the effect being the same in either case.

Having thus fully described my invention, what I claim, and desire to secure by Letters Patent, is—

1. An animal trap comprising a catching chamber, a pivoted platform or treadle therein, a door pivotally supported at its upper end, an oscillating rod having a latch supporting the free end of the door, a lever connected with and adapted to operate the said oscillating rod, and a connection between the lever and the said platform, substantially as described.

2. An animal trap comprising a catching chamber, a pivoted platform or treadle therein, an oscillating or rock shaft carrying a latch, a wheel journaled at right angles to the said rock shaft, a connection between the wheel and the treadle or platform, a door pivotally supported at its upper end, the said door having an arm adapted to engage the latch of the rock shaft, substantially as described.

3. A trap comprising a catching chamber, a treadle or platform therein, a rock shaft having a catch or arm, a wheel journaled at right angles to the shaft and having an arm, an arm extending from the rock shaft and engaging the arm of the wheel, and a connection between the wheel and the treadle or platform, and an arm upon the door adapted to engage the latch of the rock shaft, all combined to operate as described.

4. A trap comprising a catching chamber, an assembly chamber, a passage communicating with the chambers, a pivoted platform within the passage-way, arms extending in opposite directions from the platform within the catching chamber, doors pivoted at their upper ends and having arms adapted to press upon the arms of the passageway platform, a treadle or platform within the catching chamber, a rock shaft having a latch, the door having an arm adapted to engage the latch, and an operating connection between the treadle or platform within the catching chamber and the said rock shaft, the parts combined to operate substantially as set forth.

5. A trap comprising a catching chamber, a treadle or platform within the catching chamber, a rock shaft having a latch, a door pivoted at its upper end having an arm adapted to engage the latch, a wheel journaled at right angles to the rock shaft, a connection between the wheel and treadle or platform, an arm carried by the wheel, an arm extending from the rock shaft and engaging the arm of the wheel, and a weighted arm connected with the wheel for the purpose described, substantially as specified.

In testimony whereof I affix my signature in presence of two witnesses.

MARK B. MORRIS.

Witnesses:
JEROME HUBLER,
FRED J. MONTFORT.